(12) United States Patent
Tutusaus et al.

(10) Patent No.: US 10,224,569 B2
(45) Date of Patent: Mar. 5, 2019

(54) METHOD FOR SYNTHESIS OF BORON CLUSTER BASED ELECTROLYTES FOR RECHARGEABLE MAGNESIUM BATTERY

(71) Applicant: Toyota Motor Engineering & Manufacturing North America, Inc., Erlanger, KY (US)

(72) Inventors: Oscar Tutusaus, Ann Arbor, MI (US); Rana Mohtadi, Northville, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 354 days.

(21) Appl. No.: 14/919,784

(22) Filed: Oct. 22, 2015

(65) Prior Publication Data

US 2017/0117585 A1 Apr. 27, 2017

(51) Int. Cl.
*H01M 10/05* (2010.01)
*H01M 10/0568* (2010.01)
*H01M 10/054* (2010.01)
*C25C 3/04* (2006.01)
*H01M 4/58* (2010.01)
*H01M 4/46* (2006.01)

(52) U.S. Cl.
CPC .......... *H01M 10/0568* (2013.01); *C25C 3/04* (2013.01); *H01M 4/466* (2013.01); *H01M 4/5815* (2013.01); *H01M 4/5825* (2013.01); *H01M 10/054* (2013.01); *H01M 2300/0025* (2013.01)

(58) Field of Classification Search
CPC .......... H01M 10/0568; H01M 10/054; H01M 2300/0025; C25C 3/04
See application file for complete search history.

(56) References Cited

U.S. PATENT DOCUMENTS

| 3,458,580 | A | 7/1969 | Grafstein et al. |
| 6,342,621 | B1 * | 1/2002 | Mukerjee .......... B01J 31/1805 502/155 |
| 2014/0349178 | A1 | 11/2014 | Mohtadi et al. |
| 2014/0349199 | A1 | 11/2014 | Mohtadi et al. |

FOREIGN PATENT DOCUMENTS

WO 9631519 A1 10/1996

OTHER PUBLICATIONS

Tutusaus et al., "An Efficient Halogen-Free Electrolyte for Use in Rechargeable Magnesium Batteries", Angew. Chem. Int., 2015, 47 pages.
Pommerin et al., "Influence of the ball milling conditions on the preparation of rare earth aluminum hydrides", Acta Materialia Inc., 2010, 4 pages, Elsevier Ltd.

(Continued)

*Primary Examiner* — Ula C Ruddock
*Assistant Examiner* — Frank A Chernow
(74) *Attorney, Agent, or Firm* — Christopher G. Darrow; Darrow Mustafa PC

(57) ABSTRACT

Methods for forming magnesium batteries include improved processes for synthesizing magnesium electrolytes. The magnesium electrolytes include boron cluster anions, and the improved methods are solid phase or solution phase reactions that yield the desired magnesium boron cluster electrolytes from inexpensive, commercially available starting materials in a single step with relatively high purity.

11 Claims, 6 Drawing Sheets

(56) References Cited

OTHER PUBLICATIONS

Guo et al.; "Boron-based electrolyte solutions with wide electrochemical windows for rechargeable magnesium batteries"; Energy & Environ. Sci.; 2012; 5; pp. 9100-9106.
Korbe et al; "Chemistry of the Carba-closo-dodecaborate(−) Anion, CB11H12−"; Chem. Rev. 2006; 106;5208-5209.
Muldoon et al.; "Electrolyte roadblocks to a magnesium rechargeable battery"; Energy Environ. Sci.; 2012; 5; pp. 5941-5950.
Plesek et al.; "Potential Applications of the Boron Cluster Compounds"; Chem. Rev. 1992. 92. pp. 269-278.
Shelly et al.; ".eta.1-Benzene Coordination: The Synthesis and X-ray Crystal Structure of a Novel Silver Salt of the Weakly Coordinating Carborane Anion B11CH12−"; J. Am. Chem. Soc. 1985; 107; pp. 5955-5959.
Muetterties; "Boron Hydride Chemistry"; Academic Press, Inc.; 1975; in 8 pages; A Subsidiary of Harcourt Brace Jovanovich, Publishers.
Tutusaus et al.; "Functionalized Carboranyl Magnesium Electrolyte for Magnesium Battery"; U.S. Appl. No. 14/581,768, filed Dec. 23, 2014.

* cited by examiner

METHOD FOR SYNTHESIS OF BORON CLUSTER BASED ELECTROLYTES FOR RECHARGEABLE MAGNESIUM BATTERY

TECHNICAL FIELD

This present disclosure generally relates to magnesium batteries and electrolytes for use in magnesium batteries and, more particularly, to improved methods of synthesis of magnesium boron cluster salts for use as magnesium battery electrolytes.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Magnesium batteries offer the potential of good capacity and lower cost in comparison to state-of-art lithium-ion batteries, due to the divalency and relative abundance of magnesium. A challenge in the development of magnesium batteries has been in the development of electrolytes that support reversible magnesium stripping/deposition and that are stable against electrode corrosion within desired electrical potential windows.

Common magnesium salts, as well as polar aprotic solvents, generally do not support reversible magnesium stripping/deposition because they decompose at the magnesium anode surface, creating a layer that is impermeable to magnesium ions. Grignard reagents and magnesium organohaloaluminates have been shown to support reversible magnesium stripping/deposition, but are corrosive to non-noble metal cathodic current collectors at electrical potentials greater than about 2.5 V (vs. $Mg/Mg^{2+}$), thus limiting their usefulness. More recently, electrolytes based on magnesium borohydride or magnesium salts of boron cluster anions (including carboranyl anions) have shown the ability to support reversible magnesium stripping/deposition, with high oxidative stability at electrical potentials exceeding 3.5 V (vs. $Mg/Mg^{2+}$) in some cases without inducing corrosion to non-noble metal cathodic current collectors.

Existing methods for preparing magnesium salts of boron cluster anions generally rely on relatively expensive starting materials, and/or require multiple time-consuming steps to obtain product of sufficient quality. Improved methods of preparing these electrolytes could result in more time-efficient and/or cost-efficient process for forming magnesium batteries.

SUMMARY

This section provides a general summary of the disclosure, and is not a comprehensive disclosure of its full scope or all of its features.

In various aspects, the present teachings provide a method for forming a magnesium battery or a portion thereof. The method includes a step of synthesizing a magnesium boron cluster electrolyte by combining (i) a first salt having a Brønsted acidic cation and a boron cluster anion; and (ii) a second salt having a magnesium cation and a basic anion capable of deprotonating the Brønsted acidic cation of (i).

In other aspects, the present teachings provide a method for forming a magnesium battery or a portion thereof. The method includes a step of synthesizing a magnesium boron cluster salt by ball-milling a mixture that comprises (i) an alkaline salt having an alkali metal cation and a boron cluster anion; and (ii) a magnesium halide. The ball-milling can result in a solid product mixture having the magnesium boron cluster salt and an alkali metal halide. The method further includes a step of purifying the magnesium boron cluster salt from the solid product mixture.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present disclosure provides methods for forming magnesium batteries or portions thereof, including processes for synthesizing magnesium boron cluster electrolytes useful in such batteries. Magnesium boron cluster salts have been shown to be useful as electrolytes in magnesium batteries, supporting reversible magnesium deposition/stripping with high cathodic stability at electric potentials exceeding 3 V (vs. $Mg/Mg^{2+}$). Previous methods of synthesizing magnesium boron cluster salts have employed expensive and/or labile starting materials, or required multiple steps including purification steps. Methods and processes of the present disclosure form magnesium boron cluster electrolytes in fewer steps and can be based on stable, inexpensive, commercially-available starting materials.

Disclosed methods for forming a magnesium battery include a process for synthesizing a magnesium boron cluster electrolyte. In some instances, the process involves a solution-phase salt metathesis between (i) a boron cluster salt having a Brønsted acidic cation and (ii) a magnesium salt having a basic (i.e. alkaline) anion that is able to deprotonate the aforementioned Brønsted acidic cation. The products obtained by deprotonation of the Brønsted acidic cation by the basic anion may be gaseous or remain in solution. In either case, the resulting magnesium boron cluster salt is easily isolated. The solution-phase metathesis can be performed, for example, in an ether solvent. In other instances, the process for synthesizing a magnesium boron cluster electrolyte involves a solid-phase salt metathesis, via ball-milling, between a magnesium halide and an alkaline boron cluster salt. By judicious selection of a suitable ether solvent for extraction, the magnesium boron cluster salt can be easily extracted from the resulting mixture into solvent or the alkali metal halide can be extracted from the resulting mixture into solvent providing magnesium boron cluster salt as a solid.

Figure 1:
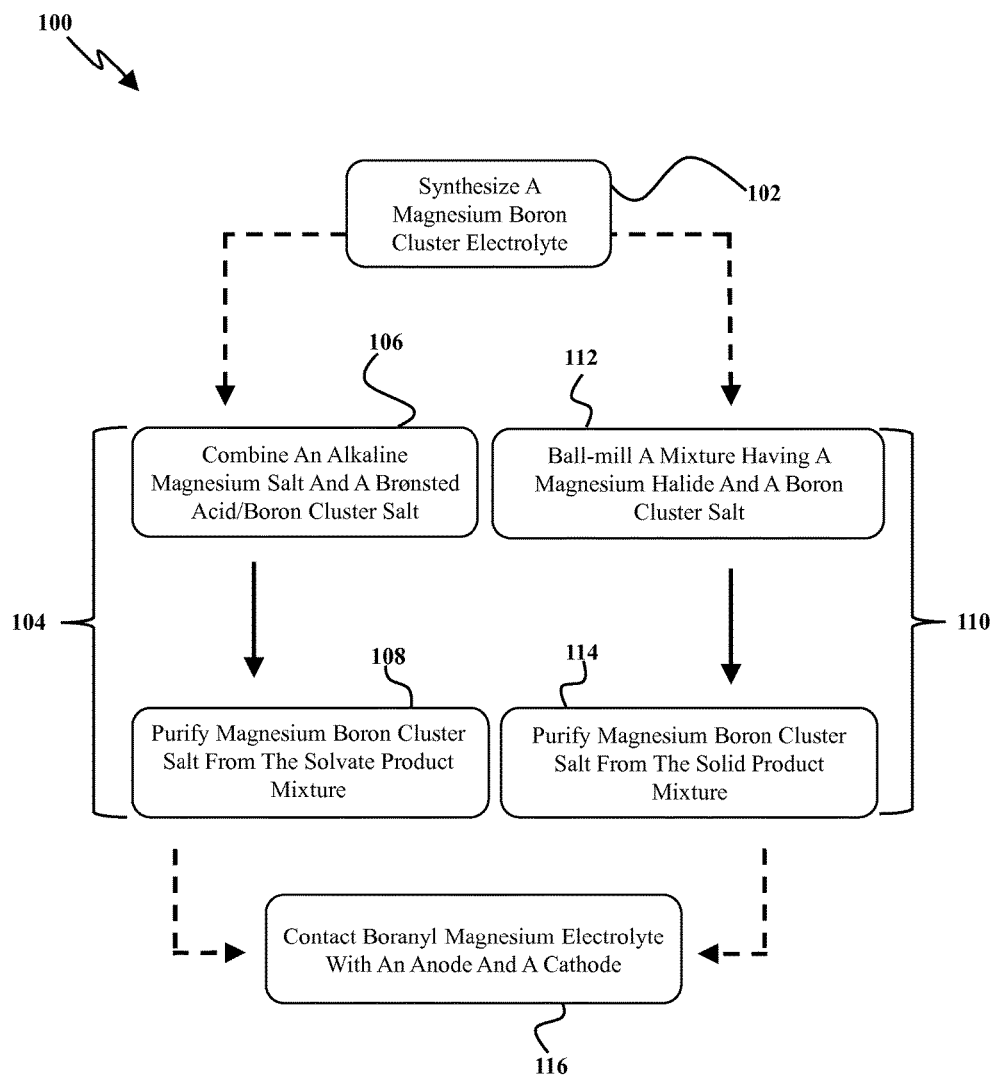
FIG. 1 is a flow-chart of a method for preparing a magnesium battery.

Accordingly, and with reference to FIG. 1, a method 100 for forming a magnesium battery, or a portion thereof, is disclosed. The method 100 includes a step 102 of synthesizing a magnesium boron cluster electrolyte. In general, the magnesium boron cluster electrolyte will include a magnesium cation and a boron cluster anion.

As used herein, the phrase "boron cluster anion" can refer to a pure boron cluster anion, alternatively referred to as a "boron hydride anion"; can refer to a hybrid carbon-boron cluster anion, alternatively referred to as a "carboranyl anion"; or can refer to a group that includes both boron hydride anions and carboranyl anions. In some variations, a boron hydride anion can include any closo-borate anion having a formula $[B_nX_n]^{2-}$, any nido-borate anion having a formula $[B_nX_{(n+3)}]^-$, or both, where n is an integer within a range of six to twelve and where X is any substituent or combination of substituents. Suitable, non-limiting examples of substituents include hydrogen, halogen, alkyl, alkoxy, cycloalkyl, aryl, aryloxy, amino, thioether, phosphine, and any other substituent compatible with magnesium metal. In some variations, a carboranyl anion can include any closo-carboranyl anion having a formula $[CB_{(n-1)}X_n]^-$ or $[C_2B_{(n-2)}X_{(n-1)}]^-$ where n and X are as defined above. In some variations, a carboranyl anion can include any nido-carboranyl anion having a formula $[C_2B_{(n-3)}X_n]^-$ or $[C_2B_{(n-3)}X_{(n-1)}]^{2-}$ where n and X are as defined above.

Figure 2A:
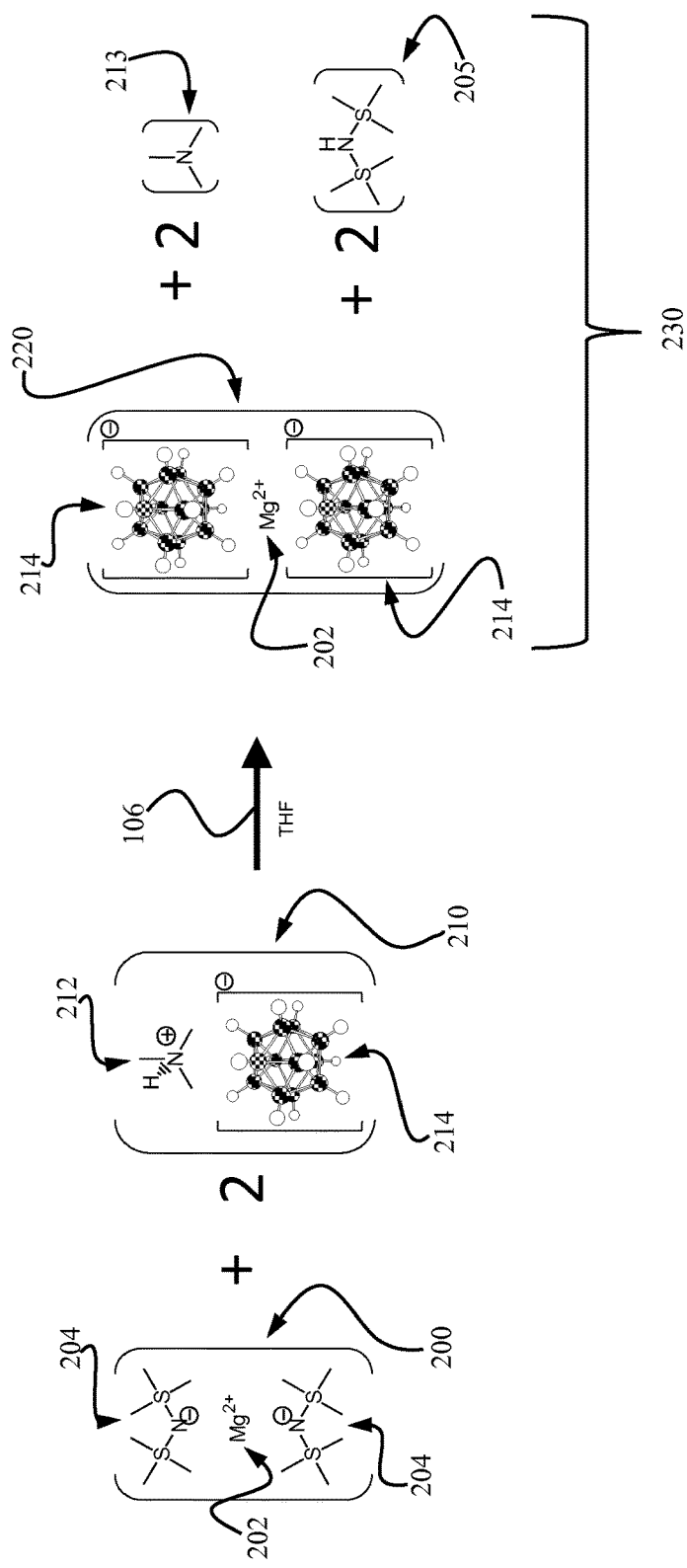
FIG. 2A is a schematic view of a process for synthesizing a magnesium boron cluster electrolyte via solution phase metathesis.
Figure 2B:
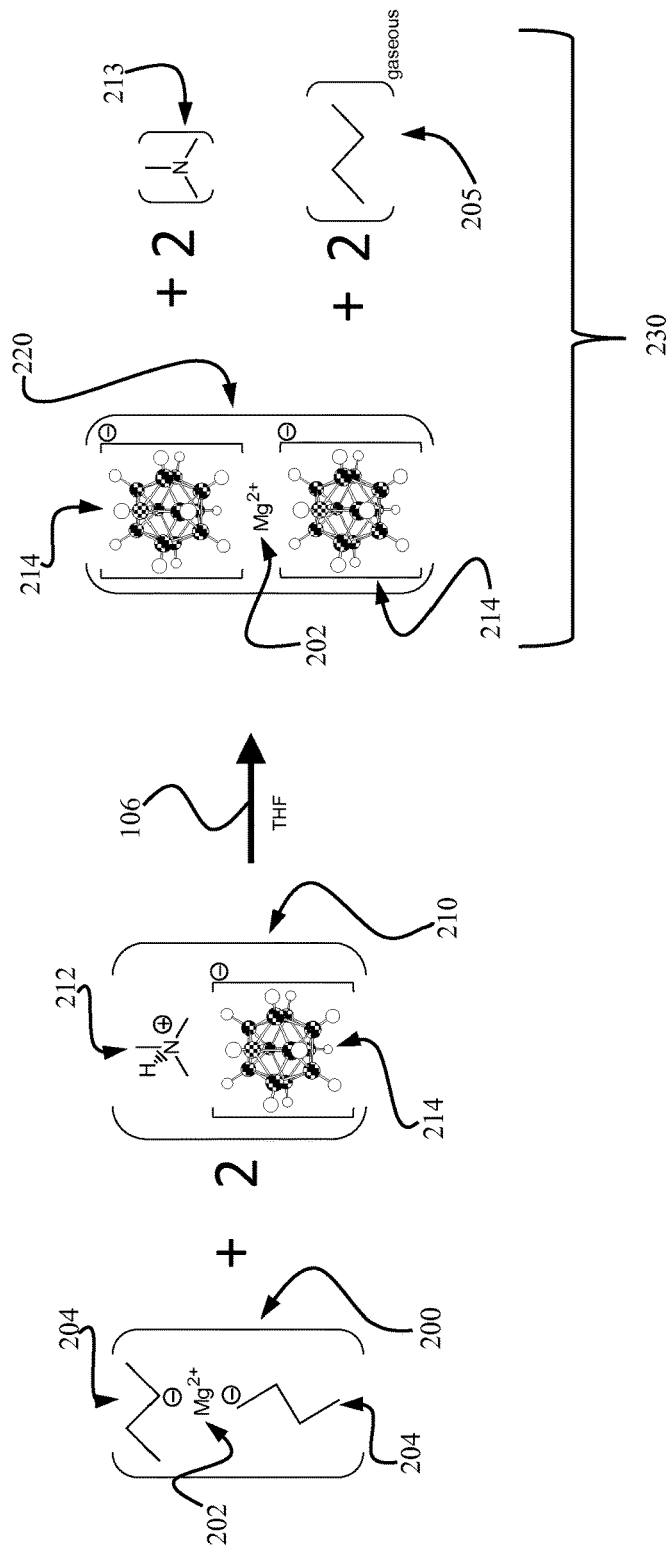
FIG. 2B is a schematic view of another variant of the process for synthesizing a magnesium boron cluster electrolyte via solution phase metathesis.

In some implementations, and with reference to FIGS. 1, 2A, and 2B, the synthesizing step 102 can be performed by a process 104 that includes a step 106 of combining (i) a first salt 210 having a Brønsted acidic cation 212 and a boron cluster anion 214; and (ii) a second salt 200 having a magnesium cation 202 and a basic anion 204 capable of deprotonating the Brønsted acidic cation 212 of (i). In many implementations, the first salt 210, the second salt 200, or both will be present in a solution when the combining step 106 is performed. In some such implementations, the solution will comprise a hydrocarbon solvent, an ethereal solvent, or a mixture thereof. Examples of suitable ether solvents include, without limitation, diethyl ether, tetrahydrofuran (THF), dimethoxyethane (glyme), bis(2-methoxyethyl) ether (diglyme), triethylene glycol dimethyl ether (triglyme), tetraethylene glycol dimethyl ether (tetraglyme), or a polyethylene glycol (PEG).

As noted above, the basic anion 204 is generally capable of deprotonating the Brønsted acidic cation 212. This can mean in some implementations that the conjugate acid of the basic anion 204 of step 106 has a $pK_a$ that is higher than a $pK_a$ of the Brønsted acidic cation 212 of step 106. In some implementations, the conjugate acid of the basic anion 204 can have a $pK_a$ at least three whole numbers greater than the $pK_a$ of the Brønsted acidic cation 212. For example, if $pK_a$ of the Brønsted acidic cation 212 in such an implantation is 7.0, then $pK_a$ of the conjugate acid of the basic anion 204 will be at least 10.0. In some implementations, the conjugate acid of the basic anion 204 can have a $pK_a$ at least ten whole numbers greater than the $pK_a$ of the Brønsted acidic cation 212. In one example, the basic anion 204 can be a hexamethyldisilazide anion, as shown in FIG. 2A. In another example, the basic anion 204 can be an alkyl anion, such as the n-butyl and sec-butyl basic anions 204 shown in FIG. 2B.

The Brønsted acidic cation 212 of step 106 can, in some implementations, have a slightly acidic proton with a positive $pK_a$, i.e. a $pK_a$ greater than zero. Below, for general guidance and not for strict limitation, are presented possible $pK_a$ ranges for the Brønsted acidic cation. In some instances, the Brønsted acidic cation 212 will have a $pK_a$ less than 14. In some instances, the Brønsted acidic cation 212 will have a $pK_a$ within a range of 7 to 14. In some particular instances, the Brønsted acidic cation 212 can be a ternary ammonium cation, such as a triethylammonium cation. In some instances, $pK_a$ values can be determined from dilute aqueous solution under standard conditions. In other instances, $pK_a$ values can be determined from dilute solution in an organic solvent under standard conditions. It will be appreciated that in instances in which a $pK_a$ of a Brønsted acidic cation 212 is compared to a $pK_a$ of the conjugate acid of a basic anion 204, such a comparison should generally refer to the same solvent in both instances.

The step 106 can include a salt metathesis reaction that produces a magnesium boron cluster salt 220, as shown in FIGS. 2A and 2B. While the exemplary reaction of FIGS. 2A and 2B employ a hexamethyldisilazide anion and n-Bu/sec-Bu anions respectively as a basic anion 204, a triethylammonium cation as a Brønsted acidic cation 212, and an unsubstituted closo-1-carba-dodecaborane anion as the boron cluster anion 214, it is to be appreciated that other species can be used, and that the reaction stoichiometry can differ accordingly from that shown in FIGS. 2A and 2B. It is also to be understood that while the exemplary reaction of FIG. 2A employs tetrahydrofuran (THF) as reaction solvent, other solvents can be employed. In addition, the first salt 210, the magnesium boron cluster salt 220, or both can have one or more solvent molecules coordinated to the magnesium cation 202. Such coordinated solvent molecules can be of the same molecular species as the solvent in which the step 106 is performed or can be a different molecular species. Such optionally coordinated solvent molecules will often produce hexacoordinate geometry at the magnesium cation 202 center.

In some implementations of the step 106, the basic anion 204 can deprotonate the Brønsted acidic cation 212 to produce a conjugate base 213 of the Brønsted acidic cation 212 and a conjugate acid 205 of the basic anion 204. In many such implementations, the conjugate base 213 and the conjugate acid 205 can be present in a liquid phase in combination with solvent. Thus, the step 106 can result in a solvate product mixture 230 that includes the magnesium boron cluster salt 220, the conjugate base 213, and the conjugate acid 205.

The process 104 can include a step 108 of purifying the magnesium boron cluster salt 220 from the solvate product mixture 230. Depending on the solubility of the magnesium boron cluster salt 220 in the solvent used, the magnesium boron cluster salt 220 can form during the step 106 as either a solid, such as a precipitate, slurry, or suspension, or as a solute dissolved in the solvent or solvents used. In some implementations in which the magnesium boron cluster salt 220 forms as a solid, the step 108 can be performed by filtering or centrifuging the solvate product mixture 230, or by applying a vacuum to evaporate solvent, conjugate base 213, and conjugate acid 205 from the solvate product mixture 230. In implementations in which the magnesium boron cluster salt 220 forms as a dissolved solute, the step 108 can be performed by extracting the magnesium boron cluster salt 220 into a solvent in which it has greater solubility, or by cooling the solvate product mixture to bring the magnesium boron cluster salt 220 out of solution, followed by a procedure such as filtration, centrifugation, or evaporation mentioned above. In some implementations, the purifying step 108 can be performed by solvent extraction or other removal of the conjugate acid 205 and/or the conjugate base 213 from the solvate product mixture 230, leaving behind the purified magnesium boron cluster salt 220.

In some implementations, as illustrated by the example of FIG. 2B, the purifying step 108 can be simplified by selecting a basic anion 204 that, when protonated, forms a gaseous conjugate acid 205, and/or by selecting a Brønsted acidic cation 212 that, when deprotonated, forms a gaseous conjugate base 213. In the example of FIG. 2B, n-butyl/sec-butyl basic anions 204 are protonated to form gaseous butane as the conjugate acid 205. Such a gaseous side product can spontaneously evolve from the solvate product mixture 230 and/or be removed by application of vacuum, as the entirety of, or a portion of, a simplified purifying step 108.

Figure 2C:
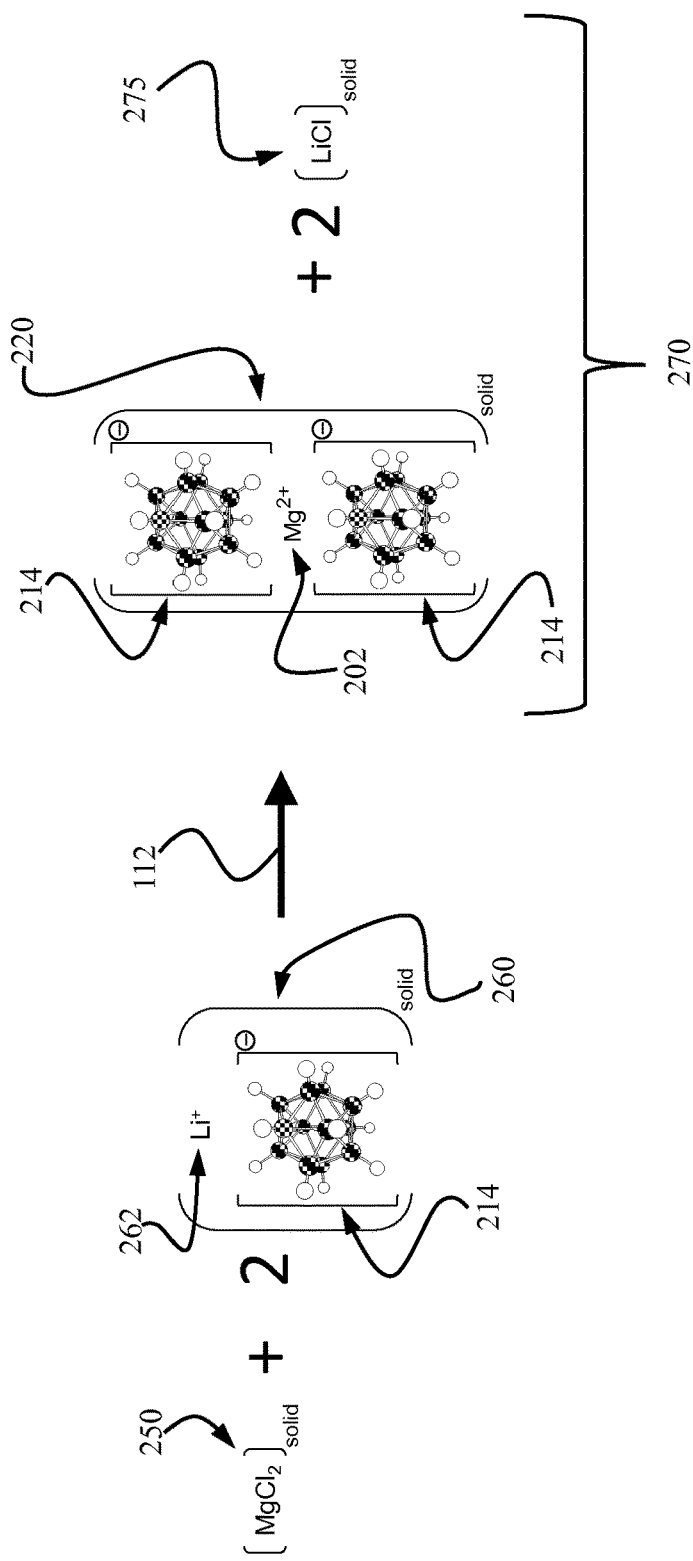
FIG. 2C is a schematic view of a process for synthesizing a magnesium boron cluster electrolyte via solid phase metathesis.

In other implementations, and with reference to FIGS. 1 and 2C, the synthesizing step 102 can be performed by a process 110 that includes a step 112 of ball-milling a mixture that includes (i) a magnesium halide salt 250, and (ii) an alkaline boron cluster salt 260 having an alkali metal cation 262 and a boron cluster anion 214. The ball-milling step 112 can include a solid phase salt metathesis that results in a solid product mixture 270 that has a magnesium boron cluster salt 220 and an alkali metal halide salt 275.

While the exemplary reaction of FIG. 2C employs a magnesium chloride as the magnesium halide salt 250 and closo-1-carba-dodecaboranyl lithium as the alkaline boron cluster salt 260, it is to be appreciated that other species can be used, and that the reaction stoichiometry can differ accordingly from that shown in FIG. 2B. In addition, the magnesium halide salt 250, the magnesium boron cluster salt 220, or both can have one or more solvent molecules, such as water, coordinated to the magnesium cation 202.

The process 110 can also include a step 114 of purifying the magnesium boron cluster salt 220 from the solid product mixture 270. In some implementations, the purifying step 114 can be performed by extracting the magnesium boron cluster salt 220 into a solvent in which the magnesium boron cluster salt 220, but not the alkali metal halide salt 275, is soluble. In some implementations, the purifying step can be performed by extracting the alkali metal halide salt 275 into a solvent in which the alkali metal halide salt 275, but not the magnesium boron cluster salt 220, is soluble. Suitable solvents for extraction can include, without limitation, an ethereal solvent, such as those mentioned above.

The method 100 can include a step 116 of placing the magnesium boron cluster electrolyte in ionic communication with (i) an anode that, when at least partially charged, contains elemental magnesium, and (ii) a cathode. In some implementations, the magnesium boron cluster electrolyte can be further purified via single or multiple recrystallization steps prior to placing the magnesium boron cluster electrolyte in ionic communication with an anode and a cathode.

The magnesium boron cluster electrolyte will generally include the purified magnesium boron cluster salt 220 synthesized in step 102 and can include, without limitation, the magnesium boron cluster salt 220 in the solid phase, as part of a solvo-ionic liquid, or in solution such as an ethereal solution. Suitable ether solvents for forming such an ethereal solution can include, without limitation, any of the ethereal solvents mentioned above. In instances where the boron magnesium salt contacted a non-ethereal solvent during step 102 (for example, during any of steps 106, 108, and 114), it may be desirable to perform an additional procedure of displacing residual non-ethereal solvent prior to performing the contacting step 116. For example, and depending on the identity of the solvent, residual non-ethereal solvents may be present in a coordination complex with the magnesium cation 202 of the magnesium boron cluster salt 220. In such an instance, it may be desirable to displace such a coordinated, non-ethereal solvent with an ethereal solvent by one or more cycles of dissolution in the desired ethereal solvent followed by precipitation or evaporation. Such examples are non-limiting, and any method of removing residual solvents that are incompatible with a magnesium anode can be employed. It will further be appreciated that it is generally undesirable to employ, during any part of processes 104 or 110, non-ethereal solvents that coordinate strongly to magnesium. This is because such solvents may be difficult to displace and may negatively impact the effectiveness of the resulting magnesium boron cluster electrolyte.

The anode employed in step 116 can comprise any material or combination of materials effective to participate in electrochemical oxidation of magnesium during a cell discharge. This can alternatively be described by stating that the anode is configured to incorporate and/or release magnesium. Similarly, the anode can comprise any material or combination of materials effective to participate in electrochemical reduction of magnesium cations and to incorporate reduced magnesium during a cell charging event. In some implementations, the anode can consist essentially of elemental magnesium (i.e. magnesium atoms having no formal charge) or comprise at least one surface layer of elemental magnesium. In other implementations, the anode can comprise an insertion-type magnesium electrode such as a tin or bismuth type anode, containing magnesium in complex or alloy with other materials to the extent the cell is charged. In variations wherein electrochemical oxidation/reduction of magnesium at the anode is reversible (e.g. in a secondary or rechargeable battery) it can be stated that the anode undergoes reversible magnesium deposition/extraction or that the anode undergoes reversible magnesium insertion/extraction.

The cathode can comprise any material or combination of materials effective to participate in electrochemical insertion of magnesium cations during a cell discharge. Similarly, the cathode can comprise any material or combination of materials effective to participate in electrochemical extraction of magnesium during a cell charging event. Suitable but non-exclusive examples of such materials can include a Chevrel phase molybdenum composition such as $Mo_6S_8$ (reversibly $MgMo_6S_8$), $FeSiO_4$ (reversibly $MgFeSiO_4$), K-$\alpha MnO_2$, $MgFePO_4$, sulfur, organosulfur compounds, air, oxygen, or any other suitable material.

The present disclosure is further illustrated with respect to the following examples. It is to be understood that these examples are provided to illustrate specific embodiments of the present disclosure and should not be construed as excluding other variations.

EXAMPLE 1

Preparation of Magnesium Electrolyte via Solution-Phase Metathesis

In a first solution-phase reaction, one equivalent of magnesium bis(hexamethyldisilazide) is combined in THF with two equivalents of triethylammonium (carba-closo-dodecaborate). A solid forms, composed substantially of solvent-coordinated magnesium bis(1-carba-closo-dodecaborate). The solid is captured by filtration, with consequent removal of liquid side products triethylamine and hexamethyldisilazane. In a second solution-phase reaction, one equivalent of n-butyl-sec-butylmagnesium is combined in THF with two equivalents of triethylammonium (carba-closo-dodecaborate). A solid forms, composed substantially of solvent-coordinated magnesium bis(1-carba-closo-dodecaborate), while gaseous butane evolves from the mixture. The solid is captured by filtration with consequent removal of liquid side product hexamethyldisilazane. While the purity of the as-synthesized magnesium bis(1-carba-closo-dodecaborate) is appreciable in both instances, it can optionally be increased by performing one or more recrystallization steps.

EXAMPLE 2

Preparation of Magnesium Electrolyte via Ball-milling

One equivalent of magnesium chloride is combined with two equivalents of lithium (1-carba-closo-dodecaborate) in a planetary ball-mill and milled in a stainless steel jar at 600 rpm for four hours. The resulting product mixture is composed of a lithium chloride powder and magnesium bis(1-carba-closo-dodecaborate) powder. The product mixture is stirred in tetraglyme for two hours to extract the magnesium bis(1-carba-closo-dodecaborate), producing an electrolyte solution.

EXAMPLE 3

Voltammetric Analysis of Electrolyte Composition vs. $Mg/Mg^{2+}$

Electrochemical testing is conducted in a three-electrode BASi 4 dram shell vial placed inside an MBraun glove box at 25° C. at less than 0.1 ppm $O_2$ and $H_2O$ content. Electrodes (0.02 $cm^2$ Pt working electrode, Mg ribbon counter electrode (BASi), and Mg wire reference electrode (BASi)) are polished, sonicated, and kept in a dry vacuum oven prior to each experiment. The surfaces of all magnesium electrodes are rubbed with a glass slide prior to use to remove any possible oxides. Voltammetry analysis is performed using a BioLogic potentiostat run at a scan rate of 5 $mV \cdot s^{-1}$ and data are acquired and analyzed with EC-lab Software®.

Figure 3:
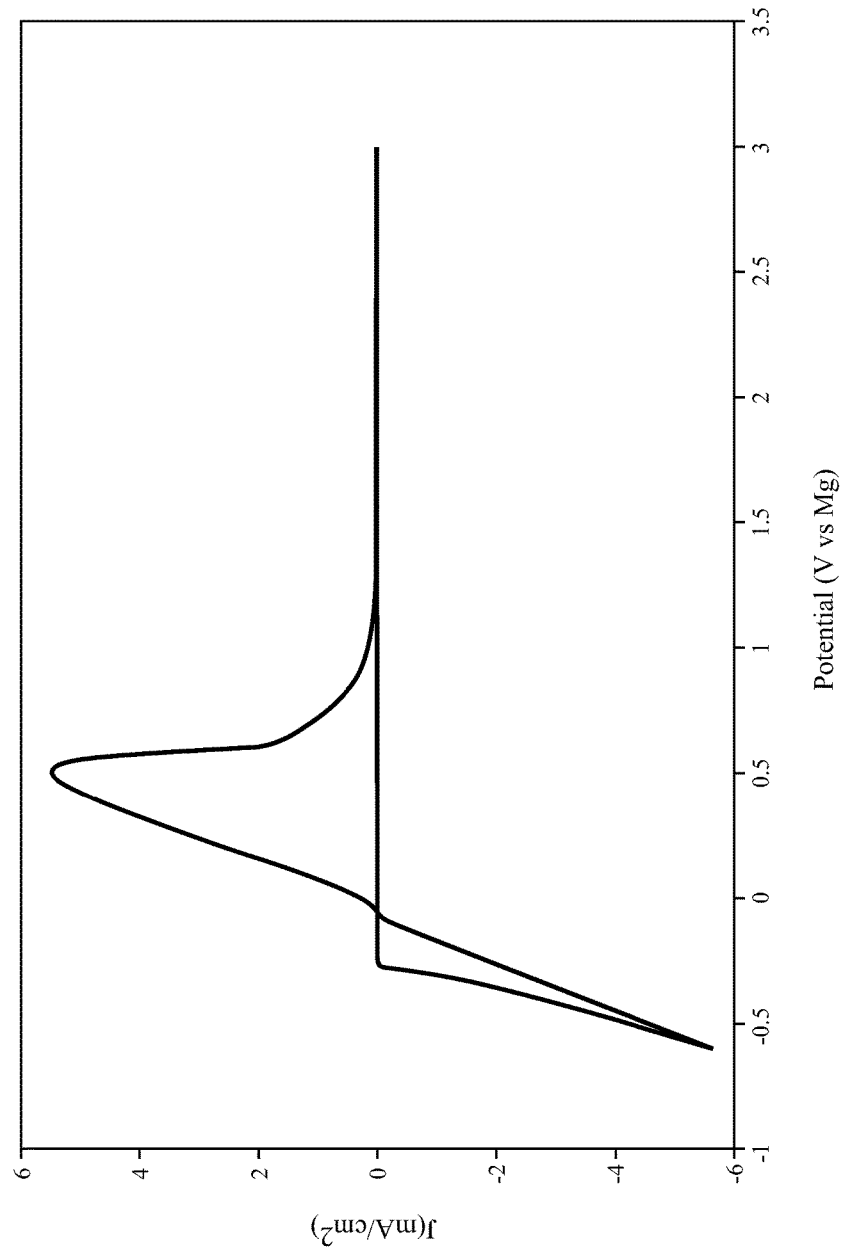
FIG. 3 is a one-cycle voltammogram of a platinum disk cathode in a magnesium battery having an electrolyte of 0.75 M $Mg[CB_{11}H_{12}]_2$, synthesized according to a method of the present disclosure, in tetraglyme.
Figure 4:
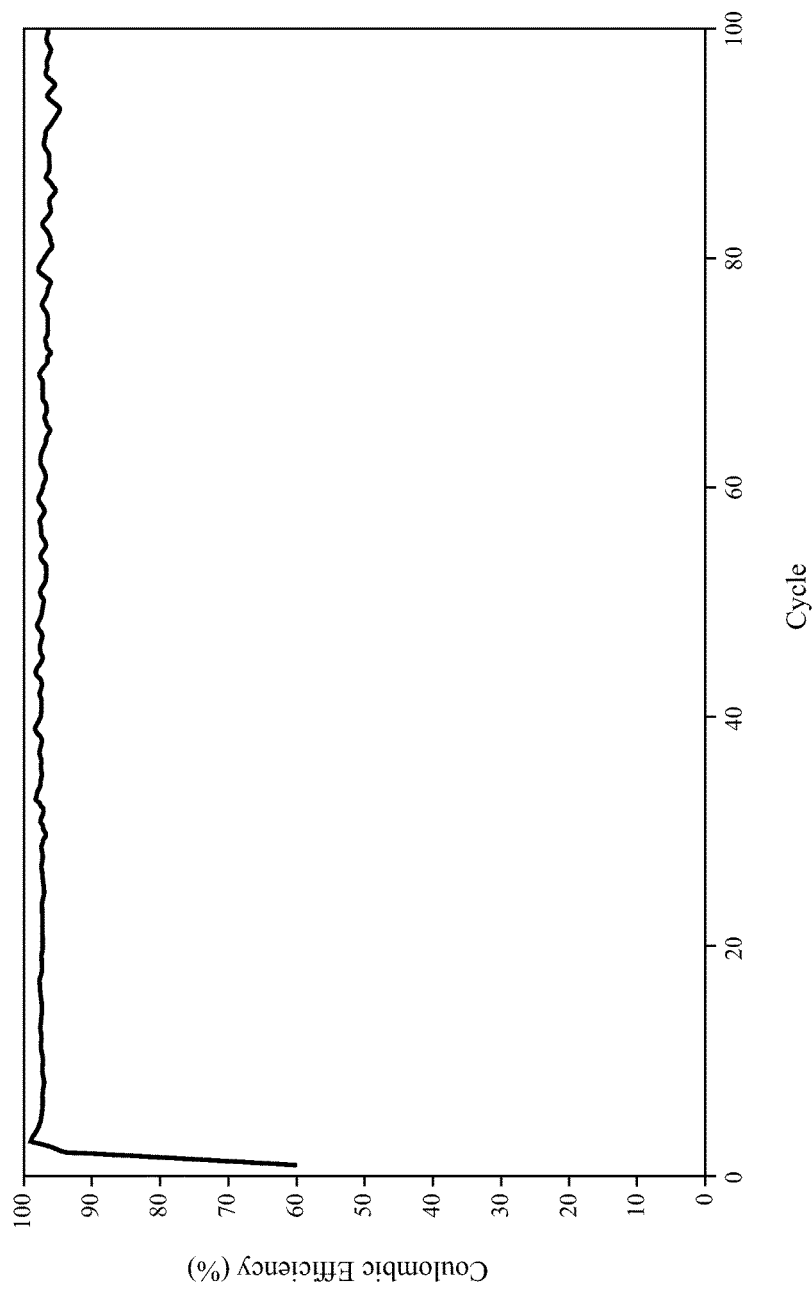
FIG. 4 is a graph of coulombic efficiency vs. cycle number for cycles 1-100 for the magnesium electrochemical cell of FIG. 1.

Magnesium bis(1-carba-closo-dodecaborate) salt prepared as described in the solution phase metathesis reaction of Example 1 is recrystallized and dissolved to 0.75 M in tetraglyme to form a magnesium boron cluster electrolyte composition for use in a magnesium electrochemical cell of the type described above. As shown in FIG. 3, this electrolyte composition has excellent stability to 3 V (vs. $Mg/Mg^{2+}$). As shown in FIG. 4, the same electrolyte has excellent Coulombic efficiency, exceeding 95% net efficiency per cycle over 100 cycles.

The preceding description is merely illustrative in nature and is in no way intended to limit the disclosure, its application, or uses. It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

What is claimed is:

1. A method for forming a magnesium battery or a portion thereof, the method comprising:
   synthesizing a magnesium boron cluster electrolyte by combining:
   a first salt having a Brønsted acidic cation and a boron cluster anion; and
   a second salt having a magnesium cation and a basic anion capable of deprotonating the Brønsted acidic cation,
   wherein combining the first and second salts results in a salt metathesis reaction, thereby producing:
   a magnesium boron cluster salt precipitate, the magnesium boron cluster salt having the magnesium cation and the boron cluster anion; and
   a third salt having a conjugate acid of the basic anion and a conjugate base of the Brønsted acidic cation.

2. The method as recited in claim 1, further comprising:
   placing the magnesium boron cluster electrolyte in ionic communication with:
   an anode that, when at least partially charged, contains elemental magnesium; and
   a cathode.

3. The method as recited in claim 1, wherein a p$K_a$ of a conjugate acid of the basic anion is higher than a p$K_a$ of the Brønsted acidic cation.

4. The method as recited in claim 3, wherein the p$K_a$ of the conjugate acid of the basic anion is at least three whole numbers greater than the p$K_a$ of Brønsted acidic cation.

5. The method as recited in claim 4, wherein the p$K_a$ of the conjugate acid of the basic anion is at least ten whole numbers greater than the p$K_a$ of Brønsted acidic cation.

6. The method as recited in claim 5, wherein the strongly basic anion is a hexamethyldisilazide anion.

7. The method as recited in claim 1, wherein a p$K_a$ of the Brønsted acidic cation is less than 14.

8. The method as recited in claim 1, wherein at least one of the first and second salts is present in a solution.

9. The method as recited in claim 8, wherein the solution comprises an ethereal solvent.

10. The method as recited in claim 1, wherein the boron cluster anion comprises a carboranyl anion.

11. The method as recited in claim 1, wherein the first salt, the second salt, and the third salt is each in solution.

* * * * *